United States Patent
Wakabayashi

(10) Patent No.: US 10,268,109 B2
(45) Date of Patent: Apr. 23, 2019

(54) PROJECTOR AND IMAGE LIGHT PROJECTION METHOD

(71) Applicant: NEC Display Solutions, Ltd., Tokyo (JP)

(72) Inventor: Osamu Wakabayashi, Tokyo (JP)

(73) Assignee: NEC DISPLAY SOLUTIONS, LTD., Tokyo (JP)

(*) Notice: Subject to any disclaimer, the term of this patent is extended or adjusted under 35 U.S.C. 154(b) by 0 days.

(21) Appl. No.: 15/557,439

(22) PCT Filed: Mar. 10, 2016

(86) PCT No.: PCT/JP2016/057606
§ 371 (c)(1),
(2) Date: Sep. 11, 2017

(87) PCT Pub. No.: WO2016/158297
PCT Pub. Date: Oct. 6, 2016

(65) Prior Publication Data
US 2018/0129127 A1 May 10, 2018

(30) Foreign Application Priority Data
Mar. 30, 2015 (WO) .................. PCT/JP2015/059935

(51) Int. Cl.
*G03B 21/20* (2006.01)
*G03B 21/00* (2006.01)
(Continued)

(52) U.S. Cl.
CPC ....... *G03B 21/2013* (2013.01); *G02B 26/008* (2013.01); *G03B 21/00* (2013.01);
(Continued)

(58) Field of Classification Search
CPC .... G03B 21/28; G03B 21/204; G03B 21/206; G03B 21/208; G03B 21/2013;
(Continued)

(56) References Cited

U.S. PATENT DOCUMENTS

| 2010/0328626 A1* | 12/2010 | Miyazaki | ............. | H04N 9/3114 |
| | | | | 353/85 |
| 2013/0021582 A1* | 1/2013 | Fujita | ................... | G03B 21/204 |
| | | | | 353/31 |

(Continued)

FOREIGN PATENT DOCUMENTS

| JP | 2012-008549 A | 1/2012 |
| JP | 2012-212129 A | 11/2012 |

(Continued)

OTHER PUBLICATIONS

International Search Report (ISR) (PCT Form PCT/ISA/210), in PCT/JP2016/057606, dated Jun. 7, 2016.

(Continued)

*Primary Examiner* — Sultan Chowdhury
(74) *Attorney, Agent, or Firm* — McGinn I.P. Law Group, PLLC

(57) ABSTRACT

A field sequential type projector comprises: a plurality of light sources that output primary color lights each having a peak wavelength in a primary color wavelength region, the primary color lights having different peak wavelengths in the primary color wavelength region; an illumination optical system that includes a video image formation device that spatially modulates the primary color lights output from the plurality of light sources to form an image light, and guides the primary color lights output from the plurality of light sources to the video image formation device; and a projection optical system that projects the image light formed by the video image formation device.

15 Claims, 7 Drawing Sheets

(51) Int. Cl.
*G03B 21/14* (2006.01)
*G02B 26/00* (2006.01)
*G03B 33/08* (2006.01)
*H04N 9/31* (2006.01)

(52) U.S. Cl.
CPC ........... *G03B 21/14* (2013.01); *G03B 21/204* (2013.01); *G03B 21/208* (2013.01); *G03B 21/2066* (2013.01); *G03B 33/08* (2013.01); *H04N 9/3114* (2013.01); *H04N 9/3158* (2013.01); *H04N 9/3161* (2013.01); *H04N 9/3164* (2013.01)

(58) Field of Classification Search
CPC ........... G03B 21/2033; G03B 21/2053; G03B 21/2066; H04N 9/311; H04N 9/3114; H04N 9/3155; H04N 9/3161; H04N 9/3164; H04N 9/3167
See application file for complete search history.

(56) References Cited

U.S. PATENT DOCUMENTS

| 2013/0100417 A1* | 4/2013 | Yang | G03B 21/204 353/31 |
| 2013/0242534 A1 | 9/2013 | Pettitt et al. | |
| 2015/0029467 A1* | 1/2015 | Sugiyama | H04N 9/3161 353/31 |
| 2015/0098065 A1* | 4/2015 | Tanaka | G03B 21/2013 353/84 |
| 2016/0164256 A1* | 6/2016 | Kuratomi | H01S 5/06825 353/85 |
| 2017/0374326 A1* | 12/2017 | Aikoh | F21V 7/22 |
| 2018/0136552 A1* | 5/2018 | Kobayashi | H05B 37/02 |

FOREIGN PATENT DOCUMENTS

| JP | 2013-008950 A | 1/2013 |
| JP | 2014-062974 A | 4/2014 |
| JP | 2014-123563 A | 7/2014 |
| JP | 2014-139689 A | 7/2014 |
| JP | 2014-160227 A | 9/2014 |
| JP | 2014-174555 A | 9/2014 |
| JP | 2015-025832 A | 2/2015 |
| JP | 2015-025941 A | 2/2015 |
| JP | 2015-028504 A | 2/2015 |
| JP | 2015-049442 A | 3/2015 |
| WO | WO 2014/038434 A1 | 3/2014 |

OTHER PUBLICATIONS

Japanese Office Action dated Jun. 5, 2018 with an English translation thereof.

* cited by examiner

PROJECTOR AND IMAGE LIGHT PROJECTION METHOD

TECHNICAL FIELD

The present invention relates to a projector that projects an image light and an image light projection method.

BACKGROUND ART

As a projector that projects color video images, there is known a projector with a field sequential type (also referred to as a single plate type) configuration in which a white light output from a light source is sequentially separated into three primary color lights of red, green and blue by means of a color wheel that rotates at a high speed, and forms a color video image by optically modulating each separated color light in accordance with a video image signal. A liquid crystal panel, a DMD (Digital Micro-mirror Device: a registered trademark), or the like is used as a video image formation device used for light modulation.

In the above-described projector using the color wheel, a high-luminance discharge lamp, or the like is used as a light source in the conventional mainstream configuration. However, in recent years, a projector using a semiconductor device such as a laser diode or an LED (Light Emitting Diode) as a light source is developed to increase the lifetime of the light source, reduce power consumption, and the like.

For example, Patent Document 1 (JP2014-139689A) discloses a projector using an LED or a laser diode as a light source, the LED or the laser diode emitting an ultraviolet light and a blue light. Patent Document 2 (JP2012-212129A) discloses a projector using a laser diode as a light source, the laser diode emitting a blue light.

When an LED or a laser diode is used as a light source, the LED or the laser diode generally outputs only a single wavelength light. In the projector disclosed in Patent Documents 1 or 2, a light output from the light source is irradiated as excitation light on phosphors to obtain three primary color lights of red, green and blue, so that the color lights that cannot be obtained from the light source directly are emitted from the phosphors, respectively. When a laser diode that emits a blue laser light is used as the light source, for example, a red light and a green light are emitted from the phosphors. Since luminous efficiency of the phosphor varies depending on the color light to be emitted (the type of phosphor), Patent Document 1 proposes that the projector be provided with two or more types of light sources that output lights of different wavelengths, to switch the light sources for emitting the excitation light depending on the phosphor.

The effect that is caused by the difference in the luminous efficiency of the phosphor can be reduced by reducing the types of phosphors. When the red light and the green light are emitted using the blue laser light as the excitation light, for example, the thinking is that it is better to use a phosphor that emits yellow light that includes red and green components rather than to use individual phosphors that emit red and preen right. In this case, the yellow light is preferably separated into the red light and the green light using the color wheel. Hereinafter, an apparatus that is provided with a light source, a phosphor, and the like, and outputs each color light for forming a color video image on a video image formation device that is referred to as a light source apparatus.

Thus, the projector in which the laser diode that emits the blue laser light is provided in the light source apparatus can obtain blue light with higher color purity and chroma than the projector in which the discharge lamp or the like is provided in the light source apparatus.

However, when each color light having the same level of luminance as the light emitted from the light source apparatus provided with the discharge lamp or the like is output from the light source apparatus provided with the laser diode, the blue light has the same luminance as that of the red light and the green light, but looks brighter than the red light and the green light. This is caused by the high chroma of the blue light obtained from the laser light, which is known as the Helmholtz-Kohlrausch effect (H-K effect).

Accordingly, when the blue laser light is used for the light source, chrome differences between the blue light and the red light and between the blue light and the green light become larger, and color breaking occurs in a projection video image more significantly than in a projector in which the discharge lamp or the like is used as the light source.

RELATED ART DOCUMENTS

Patent Documents

Patent Document 1: JP2014-139689A
Patent Document 2: JP2012-212129A

SUMMARY

It is an object of the present invention to provide a projector capable of reducing color breaking of a projection video image and an image light projection method.

To achieve the above-described object, an exemplary aspect of a projector of the present invention is a field sequential type projector, the projector including:

a plurality of light sources that output primary color lights each having a peak wavelength in a primary color wavelength region, the primary color lights having different peak wavelengths in the primary color wavelength region;

an illumination optical system that includes a video image formation device that spatially modulates the primary color lights output from the plurality of light sources to form an image light, and guides the primary color lights output from the plurality of light sources to the video image formation device; and a projection optical system that projects the image light formed by the video image formation device, wherein among the primary color lights output from the plurality of light sources, a luminance of the primary color light having a longest peak wavelength is the same as that of the primary color light having a shortest peak wavelength.

Alternatively, an exemplary aspect of the present invention provides a field sequential type projector, the projector including:

a plurality of light sources that output primary color lights each having a peak wavelength in a primary color wavelength region, the primary color lights having different peak wavelengths in the primary color wavelength region;

an illumination optical system that includes a video image formation device that spatially modulates the primary color lights output from the plurality of light sources to form an image light, and guides the primary color lights output from the plurality of light sources to the video image formation device; and a projection optical system that projects the image light formed by the video image formation device, wherein values of currents flowing through the plurality of light sources are the same.

An exemplary aspect of an image light projection method of the present invention is an image light projection method for the field sequential type projector including:

outputting primary color lights from a plurality of light sources, the primary color lights each having a peak wavelength in a primary color wavelength region, and having a different peak wavelength in the primary color wavelength region;

guiding the primary color lights by an illumination optical system to a video image formation device that spatially modulates the primary color lights to form an image light; and projecting the image light formed by the video image formation device by a projection optical system, wherein among the primary color lights output from the plurality of light sources, a luminance of the primary color light having a longest peak wavelength is the same as that of the primary color light having a shortest peak wavelength.

Alternatively, an exemplary aspect of the present invention provides an image light projection method for the field sequential type projector including:

outputting primary color lights from a plurality of light sources, the primary color lights each having a peak wavelength in a primary color wavelength region, and each having a different peak wavelength in the primary color wavelength region;

guiding the primary color lights by an illumination optical system to a video image formation device that spatially modulates the primary color lights to form an image light; and projecting the image light formed by the video image formation device by a projection optical system, wherein values of currents flowing through the plurality of light sources are the same.

EXEMPLARY EMBODIMENT

Next, the present invention is described with reference to the drawings.

As described above, the H-K effect occurs by a blue laser light with high chroma looking brighter than actual luminance. Accordingly, it is thought that this reduces color breaking by lowering the "chroma" or the "luminance" of the blue light.

However, it is not preferable that the luminance of the blue light be changed because this will cause the hue of a projection video image (color video image) to change, the projection video image being reproduced by generating a white light synthesized with color lights of red, green, and green. When the luminance of the blue light is lowered, for example, the entire projection video image results in a yellowish video image.

In the present invention, the "chroma" of the blue light is lowered to reduce the color breaking. Specifically, a plurality of types of laser diodes are prepared as light sources, the laser diodes outputting the blue lights having different peak wavelengths, and the blue lights are simultaneously emitted to increase a wavelength region width of the blue light, thereby lowering the chroma of the blue light.

Figure 1:
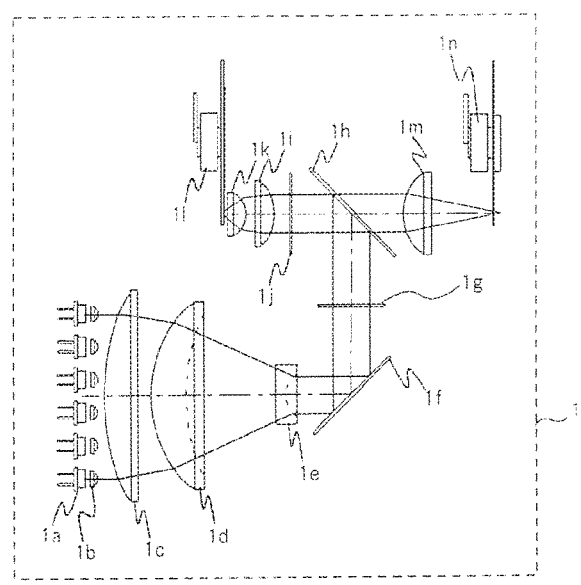
FIG. 1 is a schematic view illustrating a configuration example of a light source apparatus provided in a projector of the present invention.

FIG. 1 is a schematic view illustrating a configuration example of a light source apparatus provided in a projector of the present invention.

As illustrated in FIG. 1, light source apparatus 1 includes light source 1a, collimator lens 1b, lenses 1c to 1e, 1i, 1k, and 1m, mirror 1f, diffusion plate 1g, dichroic mirror 1h, ¼ wavelength plate 1j, phosphor unit 1l and color filter unit 1n.

A plurality of blue laser diodes (LD) that are semiconductor devices are used as light source 1a, the blue laser diode outputting a blue light having a peak wavelength in a blue wavelength region. A blue laser light of S polarization is output from each blue LD, for example.

Collimator lens 1b is provided for each blue LD, and converts the blue light output from each blue LD into a parallel luminous flux.

Lenses 1c to 1e convert each blue light incident from light source 1a through collimator lens 1b (incident luminous flux) into a parallel luminous flux whose diameter is reduced. A diameter of the outgoing luminous flux is made smaller than that of the incident luminous flux, thereby reducing sizes of members that are arranged behind the lenses 1c to 1e. An example in which three lenses 1c to 1e are used is illustrated in FIG. 1, but the number of lenses is not limited to three and may be increased or reduced as needed.

The laser light (blue light) that is emitted from lenses 1c to 1e enters diffusion plate 1g after being changed its light path by mirror 1f. After being diffused by diffusion plate 1g, the laser light enters dichroic mirror 1h.

The laser light is a coherent light that is transmitted without diffusion. When a light output from light source 1a reaches phosphor unit 1l as it is, each light output from each blue LD is irradiated on a phosphor wheel described later at condensed state. In this case, the temperature of each light condensed portion on the phosphor wheel is increased which may cause the phosphor wheel to be broken. Diffusion plate 1g diffuses each light output from each blue LD so that each light output from each blue LD is irradiated on the phosphor wheel with a uniform intensity distribution.

Dichroic mirror 1h, with respect to lights made incident as S polarized lights (first linearly polarized lights), has characteristics of transmitting the light having a first wavelength or longer, the first wavelength being longer than a wavelength of light source 1a, and reflecting the light having a wavelength under the first wavelength. Dichroic mirror 1h, with respect to lights made incident as P polarized lights (second linearly polarized lights), has characteristics of transmitting the light having a second wavelength or longer, the second wavelength being shorter than the wavelength of light source 1a, and reflecting the light having a wavelength under the second wavelength. Dichroic mirror 1h that has such characteristics can be formed by a dielectric multilayer film.

Dichroic mirror 1h guides the laser light (blue light) incident through diffusion plate 1g to phosphor unit 1l. ¼ wavelength plate 1j, and lenses 1i and 1k are arranged on the light path between dichroic mirror 1h and phosphor unit 1l.

Figure 2:
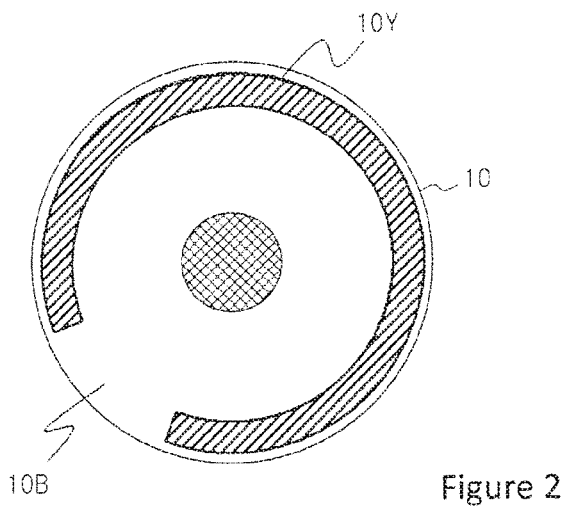
FIG. 2 is a schematic view illustrating an example of a phosphor wheel included in the light source apparatus illustrated in FIG. 1.

Phosphor unit 1l includes: phosphor wheel 10 in which a phosphor region and a reflection region are arranged, the phosphor region being provided with a phosphor that emits a laser light (blue light) as excitation light, and the reflection region reflecting the laser light (blue light); and a driving part that includes a motor for rotating phosphor wheel 10. FIG. 2 illustrates an example of phosphor wheel 10.

As illustrated in FIG. 2, phosphor wheel 10 includes; yellow phosphor region 10Y that is provided with a phosphor for emitting a yellow light; and reflection region 10B that is provided with a reflection film (mirror) for reflecting the laser light (blue light). Yellow phosphor region 10Y and reflection region 10B are aligned along a circumference of phosphor wheel 10. Ratios of areas of yellow phosphor region 10Y and reflection region 10B in a circumferential direction of phosphor wheel 10 (division ratios in the circumferential direction) are appropriately set in accordance with balance among light intensities of yellow light, red light, green light, and blue light that are included in the light output from light source apparatus 1.

In ¼ wavelength plate 1j, a linearly polarized light (S polarized light herein) incident from one surface thereof is converted to an circularly polarized light, and a circularly polarized light incident from the other surface is converted to a linearly polarized light (P polarized light) of a polarization surface (different by 90°) different from the linearly polarized light incident from the above-described one surface. Thus, the blue light (S polarized light) from dichroic mirror 1h is converted to the circularly polarized light by passing through ¼ wavelength plate 1j. In lenses 1i and 1k, the blue light (circularly polarized light) passing through ¼ wavelength plate 1j is condensed on phosphor wheel 10 of phosphor unit 1l. Then, phosphor wheel 10 is rotated to thereby sequentially irradiate the blue light (circularly polarized light) passing through lens 1k upon yellow phosphor region 10Y and reflection region 10B. In yellow phosphor region 10Y, a phosphor excited by the blue light (circularly polarized light) emits a yellow fluorescence (non-polarization). In reflection region 10B, the blue light (circularly polarized light) passing through lenses 1i and 1k is reflected in a direction of lens 1k.

The yellow fluorescence from yellow phosphor region 10Y and the blue light (circularly polarized light) from reflection region 10B sequentially pass through lenses 1k and 1i, and ¼ wavelength plate 1j to enter dichroic mirror 1h. Lenses 1k and 1i may have a configuration so that the lights from phosphor wheel 10 are parallel with each other, and may be increased or reduced as needed.

The blue light (circularly polarized light) from reflection region 10B passes through ¼ wavelength plate 1j again to thereby be converted from the polarized light from light source 1a (S polarized light) to linearly polarized light (P polarized light) whose phase differs by ½ wavelength to enter dichroic mirror 1h. Since the yellow fluorescence from yellow phosphor region 10Y is polarized light (non-polarization) that vibrates in a random direction, the light characteristic is not changed even if the yellow fluorescence passes through ¼ wavelength plate 1j. Since dichroic mirror 1h transmits the yellow light having a wavelength sufficiently longer than the wavelength of the blue light, the yellow fluorescence (non-polarization) and the blue light (P polarized light) that pass through ¼ wavelength plate 1j pass through dichroic mirror 1h, are condensed by lens 1m, and are irradiated by color filter unit 1n.

Figure 3:
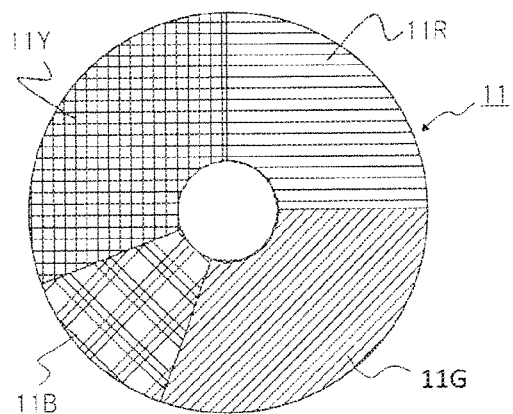
FIG. 3 is a schematic view illustrating an example of a color wheel included in the light source apparatus illustrated in FIG. 1.

Color filter unit 1n includes: color wheel 11 that separates an irradiation light into color lights; and a driving part that includes a motor for rotating color wheel 11. FIG. 3 illustrates an example of color wheel 11. As illustrated in FIG. 3, color wheel 11 includes; yellow transmission filter 11Y, red transmission filter 11R, green transmission filter 11G, and diffusion plate (diffusion region) 11B. FIG. 3 illustrates a configuration example in which color wheel 11 includes yellow transmission filter 11Y, but yellow transmission filter 11Y may not be provided.

Yellow transmission filter 11Y, red transmission filter 11R, green transmission filter 11G, and diffusion plate 11B are aligned along a circumference of color wheel 11.

Regions of yellow transmission filter 11Y, red transmission filter 11R, and green transmission filter 11G correspond to yellow phosphor region 10Y of phosphor wheel 10 illustrated in FIG. 2, and a region of diffusion plate 11B corresponds to reflection region 10B of phosphor wheel 10 illustrated in FIG. 2. Ratios of areas of yellow transmission filter 11Y, red transmission filter 11R, green transmission filter 11G, and diffusion plate 11B in a circumferential direction of color wheel 11 (division ratio in the circumferential direction) are the same as the ratios of areas of the regions of color wheel 11 respectively corresponding to the regions of phosphor wheel 10 illustrated in FIG. 2.

Phosphor wheel 10 and color wheel 11 are controlled by respective driving parts to rotate in synchronization with each other. The yellow fluorescence emitted from yellow phosphor region 10Y includes a red component and a green component, as well as a yellow component by mixing them. The light including the yellow component passes through yellow transmission filter 11Y, the light including the red component passes through red transmission filter 11R, and the light including the green component passes through green transmission filter 11G. The blue light from the reflection region 10B is output while being diffused by diffusion plate 11B. A diffusion angle of the blue light by diffusion plate 11B may be about 10 degrees, for example, but may be changed as needed.

In such a configuration in the exemplary embodiment, as described above, a plurality of types of blue LDs (excitation light sources) having different peak wavelengths are used as light sources 1a to increase a wavelength region width of the blue light, thereby lowering the chroma of the blue light and reducing the color breaking.

A blue LD from which a light having a peak wavelength of approximately 450 nm is output, and a blue LD from which a light having a peak wavelength of approximately 460 nm is output are used as the blue LD, for example. Blue LDs used as light sources 1a are not limited to two types, but more types of blue LDs may be provided. Hereinafter, one blue LD used as light source 1a is referred to as first blue LD 12, and the other blue LD used as light source 1a is referred to as second blue LD 13.

Figure 4:
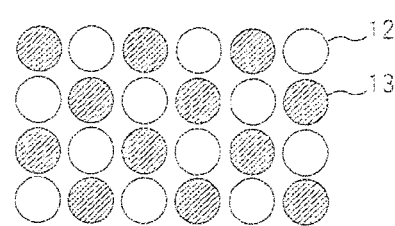
FIG. 4 is a schematic view illustrating an arrangement example of a light sources included in the light source apparatus illustrated in FIG. 1.

First blue LDs 12 and second blue LDs 13 are arranged in a matrix form as illustrated in FIG. 4, for example, and are alternately arranged so that the blue LDs that are adjacent in a row direction and in a column direction are different from each other. First blue LDs 12 and second blue LDs 13 need not be arranged in the matrix form, and may be arranged in zigzag. FIG. 4 illustrates an example in which first blue LDs 12 and second blue LDs 13 are arranged in the matrix form composed of 6 rows and 4 columns. The number of blue LDs are not limited to 6×4=24, and may be increased or reduced as needed.

As described above, the lights output from first blue LDs 12 and second blue LDs 13 included in light sources 1a are diffused by diffusion plate 1g. The luminance distribution of the lights after passing through color wheel 11 is made uniform by light tunnel 2a as described later. However, in light source apparatus 1 in the exemplary embodiment, since the plurality of types of blue LDs having different peak wavelengths are used as light sources 1a, unevenness in luminance or color occurs in the lights irradiated on phosphor wheel 10 and color wheel 11 if first blue LDs 12 and second blue LDs 13 are unevenly arranged, for example. Accordingly, it is preferred that first blue LDs 12 and second blue LDs 13 be alternately arranged so that the blue LDs that are adjacent in a row direction and in a column direction are different from each other as illustrated in FIG. 4. When more types of blue LDs are used as light sources 1a, it is preferable that the same type of blue LDs be evenly arranged.

When first blue LD 12 and second blue LD 13 included in light sources 1a have different luminances, the blue light with higher luminance looks brighter which causes the chroma of the blue light to be increased. Therefore, the luminances of first blue LD 12 and second blue LD 13 are made the same (or the same level). In this case, the chroma of a mixture color light can be mostly lowered, the mixture color light mixing the blue light output from first blue LD 12 and the blue light output from second blue LD 13. When more types of blue LDs are used as light sources 1a, the luminances of the blue light with the longest peak wavelength and the blue light with the shortest peak wavelength are preferably made the same (or the same level).

Figure 5A:
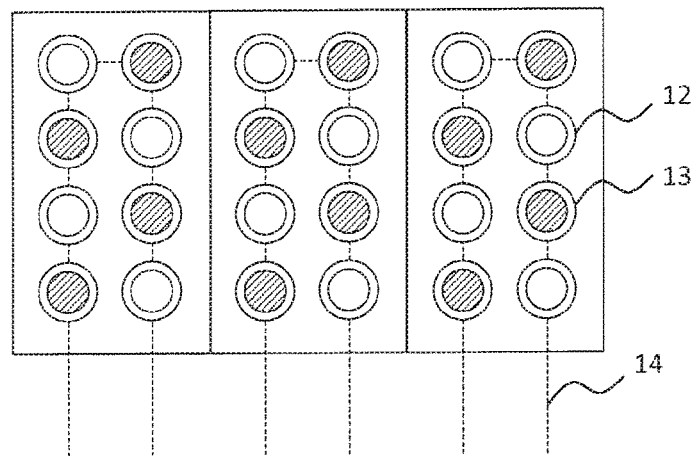
FIG. 5A is a schematic view illustrating a connection example of the light sources included in the light source apparatus illustrated in FIG. 1.
Figure 5B:
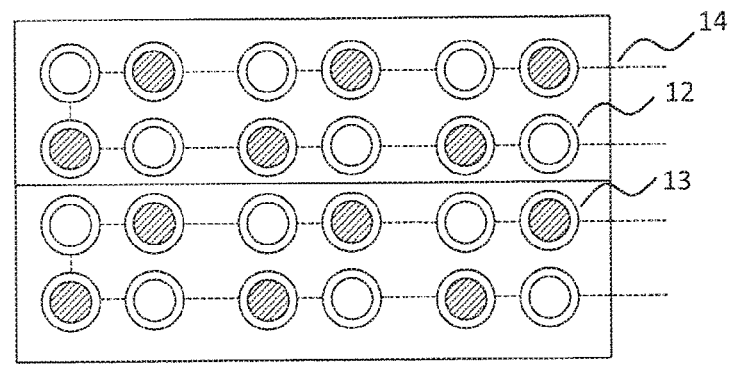
FIG. 5B is a schematic view illustrating another connection example of the light sources included in the light source apparatus illustrated in FIG. 1.

When first blue LD 12 and second blue LD 13 have a similar characteristic (forward current-relative light intensity characteristic), for example, values of currents flowing through first blue LD 12 and second blue LD 13 are preferably made the same so that the luminances of first blue LD 12 and second blue LD 13 are the same. In this case, when the plurality of first blue LDs 12 and the plurality of second blue LDs 13 are alternately connected in series using wiring board 14 as illustrated in FIGS. 5A and 5B, for example, the values of currents flowing through first blue LDs 12 and second blue LDs 13 connected in series can be made the same. When more types of blue LDs are used as light sources 1a, blue LDs are preferably connected to each other in series so that the values of the currents flowing therethrough are made the same.

Note that FIG. 5A illustrates a configuration example in which first blue LDs 12 and second blue LDs 13 are divided into three blocks, and FIG. 5B illustrates a configuration example in which first blue LDs 12 and second blue LDs 13 are divided into two blocks, and first blue LDs 12 and second blue LDs 13 being connected in series by each block. That is, FIGS. 5A and 5B each illustrate an example in which first blue LDs 12 and second blue LDs 13 are divided into a plurality of blocks having two or more light sources. In these blocks, a current may be supplied from a common power supply apparatus connected in series, or the same power supply current may be supplied from power supply apparatuses provided for respective blocks.

As described above, the light output from light source 1a is diffused by diffusion plate 1g to thereby irradiate a mixture color light on phosphor wheel 10, the mixture color light mixing the blue light output from first blue LD 12 and the blue light output from second blue LD 13. Accordingly, in the blue LD used as light source 1a, the mixture color light preferably has the peak wavelength in the wavelength region in which a desired blue light can be obtained. Since the wavelength of the blue light obtained from the discharge lamp or the like conventionally used as the light source is 400 nm to 480 nm, for example, the blue LD used as light source 1a preferably has a peak wavelength in a range from 400 nm to 480 nm.

It is desirable that the peak wavelength of the blue LD used as light source 1a be selected in consideration of the characteristic of dichroic mirror 1h included in light source apparatus 1.

Figure 6:
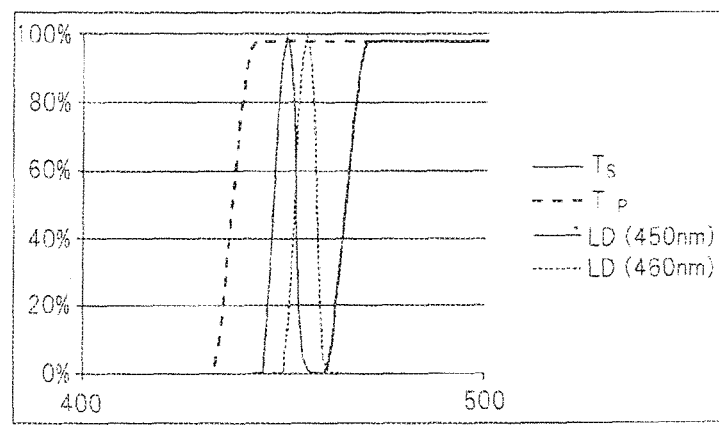
FIG. 6 is a graph showing an example of a spectral transmittance characteristic of a dichroic mirror and an emission spectrum of the light source.

FIG. 6 is a graph showing an example of a spectral transmittance characteristic of the dichroic mirror and an emission spectrum of the light source. FIG. 6 shows an example of spectral transmittance characteristics of the blue light of S polarized light (Ts) and the blue light of P polarized light (Tp).

As described above, dichroic mirror 1h included in light source apparatus 1 illustrated in FIG. 1 can separate the blue light into S polarized light and P polarized light in the wavelength range from a cutoff wavelength of S polarized light (first wavelength) to a cutoff wavelength of P polarized light (second wavelength).

In the dichroic mirror having the characteristics shown in FIG. 6, the cutoff wavelength of the blue light of S polarized light is approximately 480 nm, and the cutoff wavelength of the blue light of P polarized light is approximately 430 nm. Note that FIG. 6 shows emission spectrums of the blue LD from which the light having a peak wavelength of approximately 450 nm is output, and a blue LD from which the light having a peak wavelength of approximately 460 nm is output, simultaneously.

Accordingly, dichroic mirror 1h cannot separate the blue light into S polarized light and P polarized light in the wavelength range longer than the cutoff wavelength of S polarized light (first wavelength) and in the wavelength range shorter than the cutoff wavelength of P polarized light (second wavelength). A blue LD having a peak wavelength in a range from the first wavelength to the second wavelength is preferably selected as the blue LD used as light source 1a. Normally, a wavelength difference between the first wavelength and the second wavelength of dichroic mirror 1h is approximately 50 nm. Thus, a plurality of types of blue LDs in which the wavelength difference is within 50 nm are preferably used as light sources 1a.

An example of a projector provided with light source apparatus 1 illustrated in FIG. 1 is described using drawings.

Figure 7:
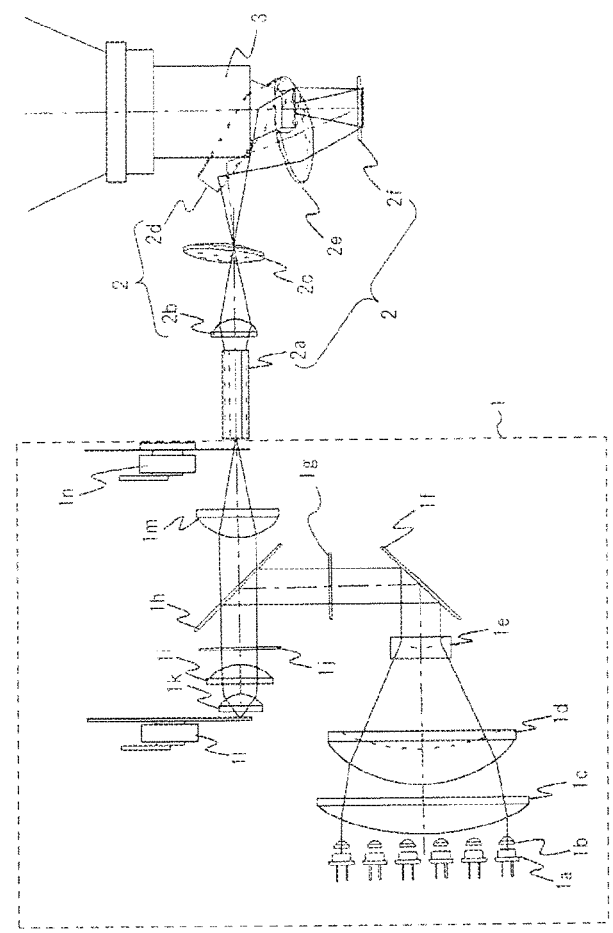
FIG. 7 is a schematic view illustrating a configuration example of a projector of the present invention.

FIG. 7 is a schematic view illustrating a configuration example of the projector of the present invention.

As illustrated in FIG. 7, the projector includes light source apparatus 1, illumination optical system 2, and projection optical system 3.

Light source apparatus 1 illustrated in FIG. 1 may be used as light source apparatus 1.

Illumination optical system 2 includes light tunnel 2a, lenses 2b, 2c and 2e, mirror 2d, and video image formation device 2f. Projection optical system 3 includes a projection lens.

A yellow light, a red light, a green light and a blue light that pass through color filter unit 1n included in light source apparatus 1 enter light tunnel 2a of illumination optical system 2.

Light tunnel 2a repeatedly totally reflects the incident light to provide the uniform luminance distribution, and then outputs the light. The light output from light tunnel 2a is irradiated on video image formation device 2f through lenses 2b and 2c, mirror 2d, and lens 2e.

Video image formation device 2f spatially modulates each of luminous fluxes of red, green, yellow, and blue to form an image light by each color light. The above-described DMD is preferably used as video image formation device 2f. The image light formed by video image formation device 2f is projected on a screen (not illustrated) or the like by enlarging by the projection lens included in injection optical system 3.

According to the present invention, the plurality of types of blue LDs are prepared as light source apparatus 1, the blue LDs outputting the blue lights having different peak wavelengths, thereby lowering the chroma of the blue light output from light source apparatus 1.

Thus, the projector capable of reducing the color breaking of the projection video image can be provided.

Figure 8:
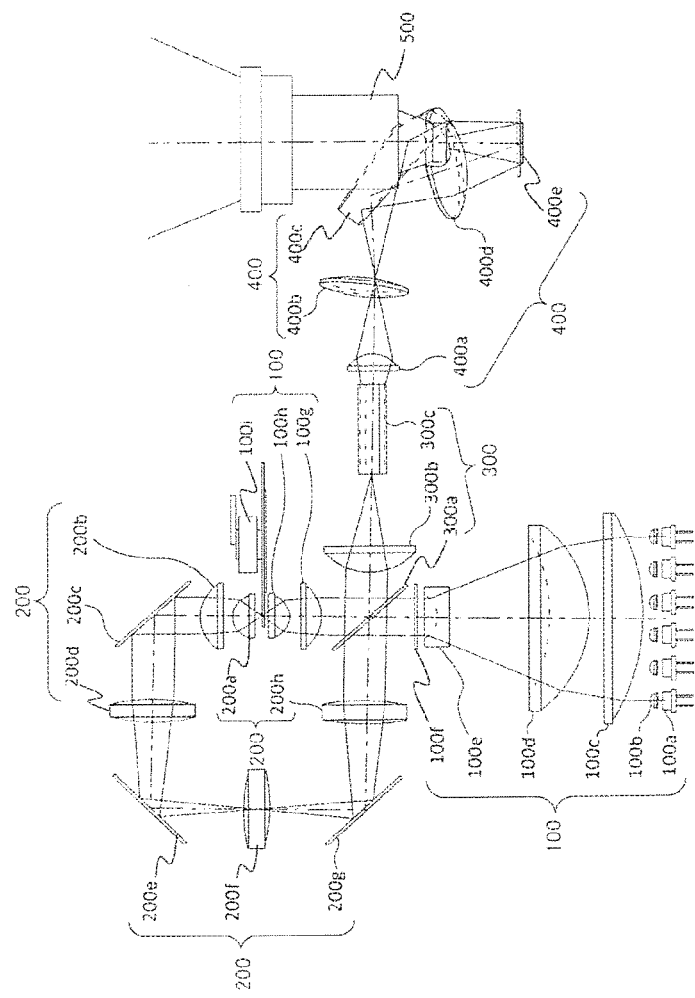
FIG. 8 is a schematic view illustrating another configuration example of a projector of the present invention.

Note that FIG. 7 illustrates a configuration example in which the projector includes light source apparatus 1 and illumination optical system 2 that guide the blue light reflected by phosphor wheel 10 to video image formation device (DMD) 2f, but the optical system of the projector is not limited to the configuration illustrated in FIG. 7. For example, there is a projector with an optical system that guides a blue light passing through the phosphor wheel to the video image formation device (DMD). FIG. 8 illustrates a configuration example of such a projector.

FIG. 8 is a schematic view illustrating another configuration example of a projector of the present invention.

The projector illustrated in FIG. 8 includes excitation optical system 100, relay optical system 200, color synthesizing system 300, illumination optical system 400, and projection optical system 500. The projector illustrated in FIG. 8, excitation optical system 100, relay optical system 200 and color synthesizing system 300 correspond to light source apparatus 1 illustrated in FIG. 1.

Excitation optical system 100 includes light source 100a, collimator lens 100b, lenses 100c to 100e, 100g, and 100h, phosphor unit 100i and diffusion plate 100f. Relay optical system 200 includes lenses 200a, 200b, 200d, and 200f, and mirrors 200c, 200e, and 200g. Color synthesizing system 300 includes dichroic mirror 300a, lens 300b, and light tunnel 300c. Illumination optical system 400 includes lenses 400a, 400b, and 400d, mirror 400c, and video image formation device (DMD) 400e. Projection optical system 500 includes a projection lens.

A plurality of types of blue laser diodes (LD) from which the blue lights having different peaks are output are used as light sources 100a, as in light source apparatus 1 illustrated in FIG. 1.

Collimator lens 100b is provided for each blue LD, and convers the blue light output from each blue LD into a parallel luminous flux.

Lenses 100c to 100e convert each blue light incident from light source 100a through collimator lens 100b (incident luminous flux) into a parallel luminous flux whose diameter is reduced. Three lenses 100c to 100e are used herein, but the number of lenses is not limited to three and may be increased or reduced as needed.

The blue light emitted from lenses 100c to 100e enters diffusion plate 100f. After being diffused by diffusion plate 100f, the blue light enters dichroic mirror 300a.

Dichroic mirror 300a illustrated in FIG. 8 has characteristics of transmitting the blue light with a relatively short wavelength and reflecting the other color lights with a relatively long wavelength (yellow light, green light, red light, and the like). That is, unlike dichroic mirror 1h included in light source apparatus 1 illustrated in FIG. 1, dichroic mirror 300a is not configured to switch transmission and reflection of the blue light by polarized lights (S polarized light and P polarized light). In the projector (optical apparatus) illustrated in FIG. 8, the peak wavelength of the blue LD used as light source 100a need not be selected in consideration of the characteristic of dichroic mirror 300a. In this case, a blue LD that has a peak wavelength in a range from 400 nm to 480 nm can be used as light source 100a.

Phosphor unit 100i includes: a phosphor wheel in which a phosphor region and a transmission region are arranged, the phosphor region being provided with a phosphor that emits a laser light (blue light) as an excitation light, and the transmission region transmitting the laser light (blue light); and a driving part that includes a motor for rotating the phosphor wheel. The phosphor wheel may include; a red phosphor region that is provided with a phosphor for emitting a red light; a green phosphor region that is provided with a phosphor for emitting a green light; and a transmission region that transmits a blue light, for example. The phosphor wheel may be provided with a yellow phosphor region that is provided with a phosphor for emitting a yellow light.

The blue light passing through dichroic mirror 300a is condensed on the phosphor wheel of phosphor unit 100i by lenses 100g and 100h. Then, the phosphor wheel is rotated to thereby sequentially irradiate the blue light (circularly polarized light) passing through lens 100h upon the red phosphor region, the green phosphor region, and the transmission region. As a result, the phosphor wheel emits the red light and the green light sequentially, and then transmits the blue light. Note that the order of the emission of the red light, the emission of the green light, and the transmission of the blue light may match the order of colors of the image lights formed by the video image formation device, and need not be in the order of red, green, and blue.

The blue light passing through the phosphor wheel is guided to dichroic mirror 300a by relay optical system 200. After passing through dichroic mirror 300a, the blue light is condensed by lens 300a, and then enter light tunnel 300c.

On the other hand, red fluorescence and green fluorescence from the phosphor wheel that emits the blue light as an excitation light enter dichroic mirror 300a through lenses 100g and 100h. Dichroic mirror 300a reflects the red fluorescence and the green fluorescence from the phosphor wheel and changes their light paths to guide the red fluorescence and the green fluorescence to light tunnel 300c.

The light output from light tunnel 300c is irradiated on video image formation device (DMD) 400e through lenses 400a and 400b, mirror 400c, and lens 400d as in the projector illustrated in FIG. 7. The image light formed by video image formation device 400e is projected on a screen (not illustrated) or the like by enlarging by projection lens 500a included in projection optical system 500.

In the configuration illustrated in FIG. 8, the projector capable of reducing the color breaking of the projection video image can be also provided.

Furthermore, in the light source apparatus (excitation optical system 100, relay optical system 200, and color synthesizing system 300) illustrated in FIG. 8, the peak wavelength of the blue LD used as light source 100a need not be selected in consideration of the characteristic of dichroic mirror 300a. Therefore, the flexibility of selection of the blue LD used as light source 100a is improved compared with light source apparatus 1 illustrated in FIG. 1.

The present invention has been described with reference to the exemplary embodiment, but the present invention is not intended to be limited to the exemplary embodiment. A configuration and details of the present invention may be modified in various ways within the scope of the present invention in a manner that a person skilled in the art can understand.

The invention claimed is:

1. A field sequential type projector, comprising:
a plurality of light sources that output primary color lights each having a peak wavelength in a primary color wavelength region, the primary color lights having different peak wavelengths in the primary color wavelength region;
an illumination optical system that includes a video image formation device that spatially modulates the primary color lights output from said plurality of light sources to form an image light, and guides the primary color lights output from said plurality of light sources to the video image formation device;
a projection optical system that projects the image light formed by the video image formation device,
wherein among the primary color lights output from said plurality of light sources, a luminance of the primary color light having a longest peak wavelength is the same as that of the primary color light having a shortest peak wavelength,
wherein
the primary color light is a blue light; and
a phosphor wheel on which the blue lights output from said plurality of light sources are irradiated, and said phosphor wheel includes a phosphor region that emits the blue light as an excitation light, and a reflection region that reflects the blue light.

2. The field sequential type projector according to claim 1, further comprising:
a dichroic mirror that guides the blue lights output from said plurality of light sources to said phosphor wheel; and
a ¼ wavelength plate are arranged on a light path between said phosphor wheel and said dichroic mirror,
wherein said dichroic mirror reflects blue lights of first linearly polarized lights that are output from said plurality of light sources, and transmits blue lights of second linearly polarized lights that are incident from said phosphor wheel through said ¼ wavelength plate.

3. The field sequential type projector according to claim 2, further comprising:
a color wheel that includes a red transmission filter for transmitting a red light, a green transmission filter for transmitting a green light, and a diffusion region for diffusing and transmitting the blue light, wherein
the fluorescence from said phosphor wheel is irradiated on the red transmission filter and the green transmission filter, and the blue light from said phosphor wheel is irradiated on the diffusion region through said dichroic mirror, and
the fluorescence and the blue light from said phosphor wheel are sequentially irradiated on the red transmission filter, the green transmission filter and the diffusion region.

4. The field sequential type projector according to claim 1, wherein
said light sources are semiconductor devices that output laser light.

5. The field sequential type projector according to claim 1, wherein
the primary color lights output from said plurality of light sources each have a peak wavelength in a range from 400 nm to 480 nm.

6. The field sequential type projector according to claim 1, wherein
said plurality of light sources are electrically connected to each other in series.

7. A field sequential type projector, comprising:
a plurality of light sources that output primary color lights each having a peak wavelength in a primary color wavelength region, the primary color lights having different peak wavelengths in the primary color wavelength region;
an illumination optical system that includes a video image formation device that spatially modulates the primary color lights output from said plurality of light sources to form an image light, and guides the primary color lights output from said plurality of light sources to the video image formation device;
a projection optical system that projects the image light formed by the video image formation device,
wherein among the primary color lights output from said plurality of light sources, a luminance of the primary color light having a longest peak wavelength is the same as that of the primary color light having a shortest peak wavelength,
wherein
the primary color light is a blue light; and
a phosphor wheel on which the blue lights output from said plurality of sources are irradiated, and said phosphor wheel includes a phosphor region that emits the blue light as an excitation light, and a transmission region that transmits the blue light.

8. The field sequential type projector according to claim 7, further comprising:
a dichroic mirror that guides the blue lights output from said plurality of light sources to said phosphor wheel; and
a relay optical system that guides the blue lights passing through said phosphor wheel to said dichroic mirror,
wherein said dichroic mirror transmits the blue lights output from said plurality of light sources and the blue lights incident from said phosphor wheel through said relay optical system, and reflects a fluorescence emitted from said phosphor wheel.

9. A field sequential type projector, comprising:
a plurality of light sources that output primary color lights each having a peak wavelength in a primary color wavelength region, the primary color lights having different peak wavelengths in the primary color wavelength region;
an illumination optical system that includes a video image formation device that spatially modulates the primary color lights output from said plurality of light sources to form an image light, and guides the primary color lights output from said plurality of light sources to the video image formation device;
a projection optical system that projects the image light formed by the video image formation device,
wherein values of currents flowing through said plurality of light sources are the same,
wherein
the primary color light is a blue light; and
a phosphor wheel on which the blue lights output from said plurality of light sources are irradiated, and said phosphor wheel includes a phosphor region that emits the blue light as an excitation light, and a reflection region that reflects the blue light.

10. The field sequential type projector according to claim 9, further comprising:
a dichroic mirror that guides the blue lights output from said plurality of light sources to said phosphor wheel; and
a ¼ wavelength plate are arranged on a light path between said phosphor wheel and said dichroic mirror,
wherein said dichroic mirror reflects blue lights of first linearly polarized lights that are output from said plurality of light sources, and transmits blue lights of second linearly polarized lights that are incident from said phosphor wheel through said ¼ wavelength plate.

11. The field sequential type projector according to claim 10, further comprising:
a color wheel that includes a red transmission filter for transmitting a red light, a green transmission filter for transmitting a green light, and a diffusion region for diffusing and transmitting the blue light, wherein
the fluorescence from said phosphor wheel is irradiated on the red transmission filter and the green transmission filter, and the blue light from said phosphor wheel is irradiated on the diffusion region through said dichroic mirror, and
the fluorescence and the blue light from said phosphor wheel are sequentially irradiated on the red transmission filter, the green transmission filter and the diffusion region.

12. The field sequential type projector according to claim 9, wherein
said plurality of light sources are electrically connected to each other in series.

13. A field sequential type projector, comprising:
a plurality of light sources that output primary color lights each having a peak wavelength in a primary color wavelength region, the primary color lights having different peak wavelengths in the primary color wavelength region;
an illumination optical system that includes a video image formation device that spatially modulates the primary color lights output from said plurality of light sources to form an image light, and guides the primary color lights output from said plurality of light sources to the video image formation device;
a projection optical system that projects the image light formed by the video image formation device,
wherein values of currents flowing through said plurality of light sources are the same,
wherein
the primary color light is a blue light; and
a phosphor wheel on which the blue lights output from said plurality of light sources are irradiated, and
said phosphor wheel includes a phosphor region that emits the blue light as an excitation light, and a transmission region that transmits the blue light.

14. The field sequential type projector according to claim 13, further comprising:
a dichroic mirror that guides the blue lights output from said plurality of light sources to said phosphor wheel; and
a relay optical system that guides the blue lights passing through said phosphor wheel to said dichroic mirror,
wherein said dichroic mirror transmits the blue lights output from said plurality of light sources and the blue lights incident from said phosphor wheel through said relay optical system, and reflects a fluorescence emitted from said phosphor wheel.

15. A method for a field sequential type projector, the method comprising:
outputting from a plurality of light sources, primary color lights each having a peak wavelength in a primary color wavelength region, the primary color lights having different peak wavelengths in the primary color wavelength region;
spatially modulating, by an illumination optical system that includes a video image formation device, the primary color lights output from said plurality of light sources to form an image light, and guiding the primary color lights output from said plurality of light sources to the video image formation device;
projecting, by a projection optical system, the image light formed by the video image formation device,
wherein values of currents flowing through said plurality of light sources are the same,
wherein the primary color light comprises a blue light; and
irradiating on a phosphor wheel, the blue lights output from said plurality of light sources,
wherein said phosphor wheel includes a phosphor region that emits the blue light as an excitation light, and a reflection region that reflects the blue light.

* * * * *